United States Patent
Das et al.

(10) Patent No.: US 9,794,264 B2
(45) Date of Patent: Oct. 17, 2017

(54) PRIVACY CONTROLLED NETWORK MEDIA SHARING

(71) Applicant: CodePix Inc., Irvine, CA (US)

(72) Inventors: Timothy Das, Irving, TX (US); Julie Hong, Alameda, CA (US)

(73) Assignee: CodePix Inc., Irvine, CA (US)

( * ) Notice: Subject to any disclaimer, the term of this patent is extended or adjusted under 35 U.S.C. 154(b) by 119 days.

(21) Appl. No.: 14/605,905

(22) Filed: Jan. 26, 2015

(65) Prior Publication Data

US 2016/0219057 A1   Jul. 28, 2016

(51) Int. Cl.
*H04L 29/06*   (2006.01)
*G06F 3/0488*   (2013.01)
*G06F 21/10*   (2013.01)
*G06F 21/62*   (2013.01)

(52) U.S. Cl.
CPC ........ *H04L 63/101* (2013.01); *G06F 3/04883* (2013.01); *G06F 21/10* (2013.01); *G06F 21/62* (2013.01); *G06F 21/6209* (2013.01); *H04L 67/38* (2013.01)

(58) Field of Classification Search
CPC combination set(s) only.
See application file for complete search history.

(56) References Cited

U.S. PATENT DOCUMENTS

| 6,094,483 | A  | 7/2000 | Fridrich et al. |
| 6,715,911 | B2 | 4/2004 | Villarreal et al. |
| 8,051,462 | B2 | 11/2011 | Hamilton, II et al. |
| 8,732,853 | B1 * | 5/2014 | Byrne ................. H04L 63/0838 713/183 |
| 9,230,076 | B2 * | 1/2016 | King ....................... G06F 21/53 |
| 2003/0163708 | A1 | 8/2003 | Tang |
| 2008/0168154 | A1 | 7/2008 | Skyrm et al. |
| 2010/0021012 | A1 | 1/2010 | Seegers et al. |
| 2010/0031014 | A1 | 2/2010 | Senda |
| 2010/0228804 | A1 | 9/2010 | Dasgupta et al. |
| 2011/0007160 | A1 | 1/2011 | Okumura et al. |
| 2011/0007171 | A1 | 1/2011 | Okumura et al. |
| 2012/0131471 | A1 | 5/2012 | Terlouw et al. |

(Continued)

FOREIGN PATENT DOCUMENTS

| EP | 2605167 A1 | 6/2013 |
| EP | 2631779 A1 | 9/2013 |

(Continued)

*Primary Examiner* — Beemnet Dada
(74) *Attorney, Agent, or Firm* — Brian T. Rivers

(57) ABSTRACT

A Privacy Controlled Social Network including a first device that shares content with a second device through at least one network, where content is "encoded" or "locked" at the first device by applying a locking code. In embodiments, the locked content that is shared may include media that is locked by applying the locking code at the first device. The locked content may be shared with the second device and include a message or caption that is not locked and viewable by the recipient user of the second device. The locked content may be unlocked by providing the appropriate code to a user interface to unlock the content for the user of the second device. A lock/unlock scheme using input related to a display of an item associated with the content to lock/unlock the content may utilize gestures on a touch screen displaying the item as the lock/unlock code.

20 Claims, 6 Drawing Sheets

(56) References Cited

U.S. PATENT DOCUMENTS

| | | |
|---|---|---|
| 2012/0293544 A1 | 11/2012 | Miyamoto et al. |
| 2012/0330834 A1 | 12/2012 | Aidasani et al. |
| 2012/0330836 A1 | 12/2012 | Aidasani et al. |
| 2013/0077817 A1 | 3/2013 | Naparstek et al. |
| 2013/0091551 A1 | 4/2013 | Rajakarunanayake et al. |
| 2013/0117365 A1 | 5/2013 | Padmanabhan et al. |
| 2013/0124508 A1 | 5/2013 | Paris et al. |
| 2013/0159412 A1 | 6/2013 | Robinson et al. |
| 2013/0227450 A1 | 8/2013 | Na et al. |
| 2013/0239003 A1 | 9/2013 | Usenko et al. |
| 2015/0067327 A1* | 3/2015 | Lipton .................. H04L 63/083 713/168 |

FOREIGN PATENT DOCUMENTS

| | | |
|---|---|---|
| WO | WO03073286 A1 | 9/2003 |
| WO | WO2006003599 A1 | 1/2006 |
| WO | WO2013001152 A1 | 1/2013 |
| WO | WO2013125911 A1 | 8/2013 |

* cited by examiner

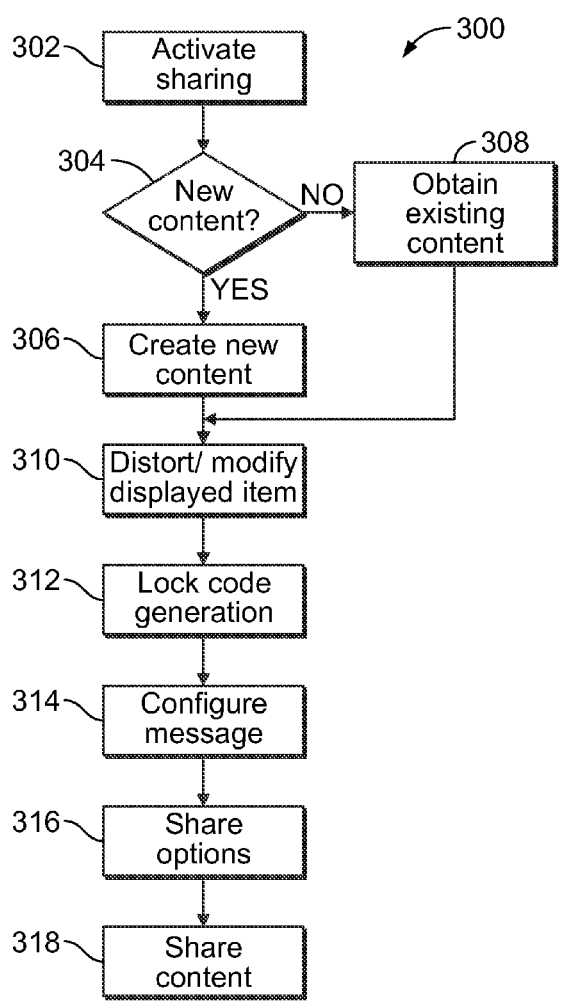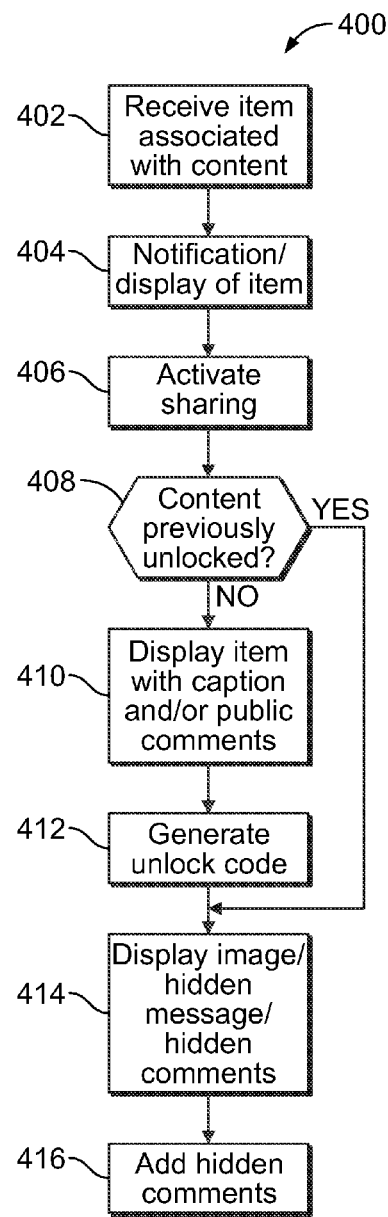
FIG. 3
FIG. 4

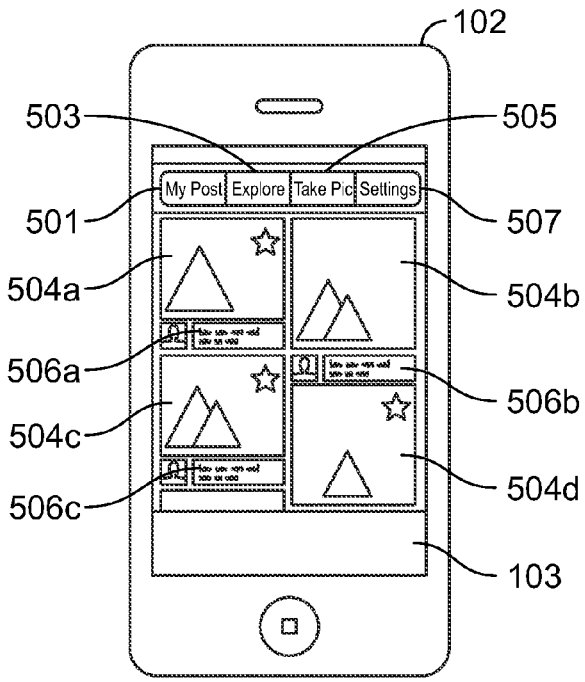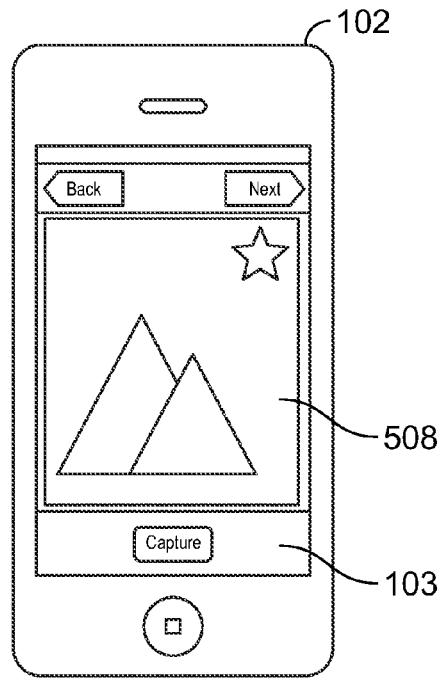
FIG. 5A                FIG. 5B
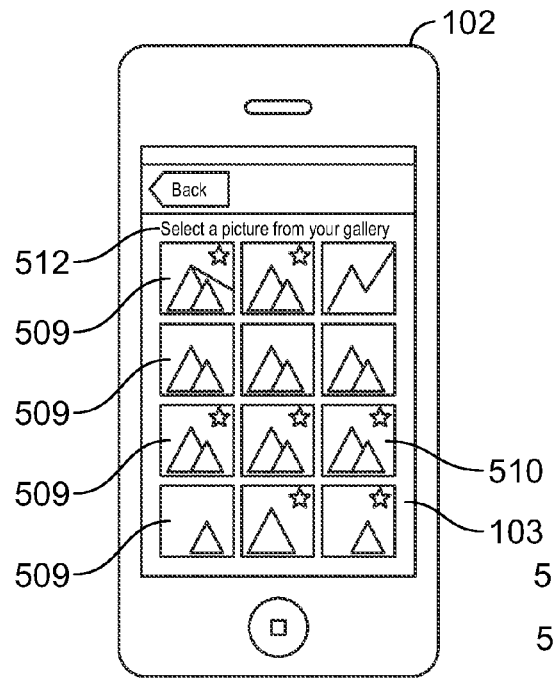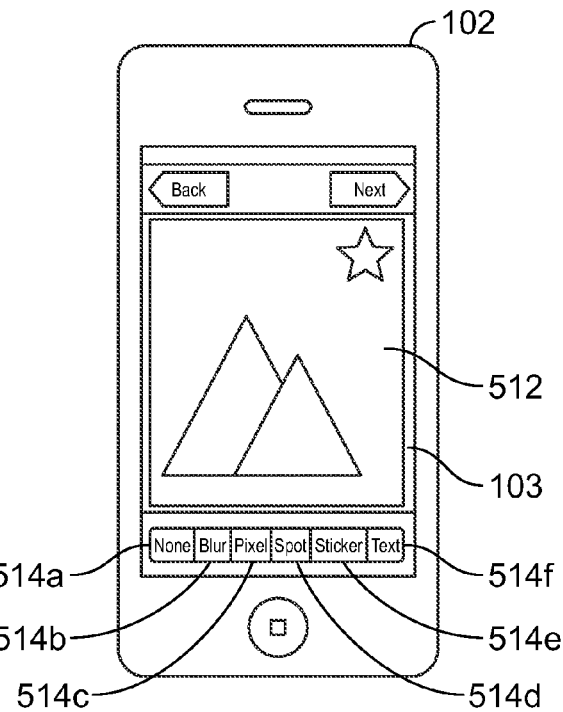
FIG. 5C                FIG. 5D

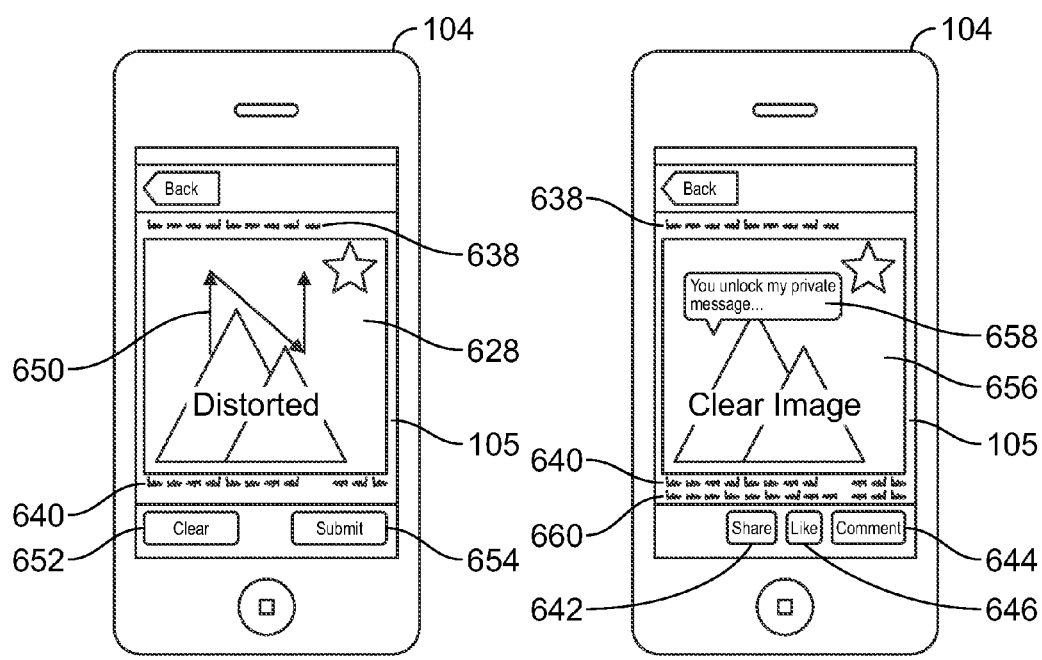

PRIVACY CONTROLLED NETWORK MEDIA SHARING

BACKGROUND

The use of social networking and messaging services over mobile communications networks has become increasingly popular as the number of users of mobile devices has increased. This has been particularly notable as the use of smartphones and tablets has increased. The increase in popularity of these social networking and messaging services has also been accompanied by constant advancement in the capabilities and the technologies of the devices, networks and systems used to provide these services. Social networking and messaging services may be provided to end users by utilizing different types of interconnected networks having different communications capabilities such as, for example the internet, cellular networks, Wi-Fi, Bluetooth, etc. The services may be made available to many individual users each having different types of devices such as smart phones, tablets, desktop personal computers, laptops, or other types of communication devices. The increase in popularity of social networking and messaging services on mobile devices has also resulted in creation of new service providers and in new services for messaging and sharing of content and media. These services may comprise publicly accessible social network services that include control of the privacy of communication and content within a social platform. This control includes allowing users control of access to their shared graphical and textual content and allows identity verification of social network members for sharing content.

Social Networking and messaging will continue to grow in popularity in conjunction with increasing concerns about personal privacy for users' communication and content in online social environments.

As a result of the growth and creation of large numbers of social networking/messaging services and personal privacy concerns, it would be desirable to have a service that allowed users to share secret "encoded" media such as, for example, photos and chats, with their trusted friends through the service and also allowed sharing across various other independent social media platforms. Further, it would be desirable that such a service provided secure sharing of the shared media in a user friendly manner and was adaptable and flexible in providing interaction with other social media platforms.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Example embodiments are disclosed for systems, methods and apparatus that utilize a first device to share content with a second device through at least one network, where the content is "encoded" or "locked" at the first device by applying a locking code before sharing. In the embodiments, the locked content that is shared may include media, which may be locked by applying the locking code at a user interface of the first device, and a locked private message portion. The locked content may be shared with the second device. In one embodiment the content may be associated with a displayed item, the display of which may be distorted or modified before locking and the displayed item as locked may be sent to the second device to facilitate secure sharing of the locked content. The displayed item associated with the content may be a display of the content itself or a related displayed item. A message or caption portion input at the first device that is not locked and viewable by the recipient user of the second device may also be associated with the locked content. The locked content may be unlocked at the second device by providing an appropriate unlock code to a user interface at the second device to allow access to the content for the user recipient of the second device. The unlock code may entered in relation to a display of the item associated with the locked content, the display of which may be distorted or modified as shared and received along with the locked content. The locked private message portion may also be viewable upon unlocking the locked content.

In one example embodiment, a device includes a user interface for receiving input, and a processor and memory that includes code. The code is executable to control the device to activate a sharing function for sharing content through at least one network in response to input received at the user interface. A lock code is generated from input received at the user interface as input related to a display of an item associated with the content to lock at least a selected portion of the content to create locked content. The locked content may be shared with at least one other device that receives the shared content through at least one network. In an implementation of the embodiment, the user interface may include a touchscreen and the lock code input related to a display of the item may be received as gestures on the touch screen displaying the item to lock the content. The displayed item associated with the content may be the content itself or a related item representing the content. The displayed item may be modified or distorted before locking and included with the shared locked content as modified or distorted.

In another example embodiment, a device includes a user interface for receiving input and a processor and memory including code. The code is executable to control the device to receive locked content, wherein the locked content was shared through at least one network by another device. A sharing function may be activated for processing the locked content. Input received on the user interface as input related to a display of a shared item associated with the locked content may be used to generate an unlock code to unlock the locked content. The code is executable to control the device to display the locked content as unlocked content when the unlock code matches the lock code used to lock the content and provide access to the unlocked content at the device. In an implementation of the embodiment, the user interface may include a touchscreen and the unlock code input related to a display of the shared item may be received as gestures on the touch screen displaying the shared item. The displayed shared item associated with the content may be the content itself or a related item representing the content. The displayed item may be modified or distorted and included with the received locked content as modified or distorted at the first device. When the locked content is unlocked the displayed item or content may be displayed in an undistorted or unmodified form.

In the example embodiments, recipients of shared content designated by the originator of the shared content may be able to receive notifications of shared content, other recipients' comments on the shared content, and comment on the shared content. The comment stream may be aggregated, visible to recipients and updated in real-time. The comment stream may include public comments or private comments available only to recipients who have unlocked a particular shared locked content.

BRIEF DESCRIPTION OF THE DRAWINGS

FIG. 3 is a flow diagram illustrating example operations of a process for sharing locked content;

FIG. 4 is a flow diagram illustrating example operations of a process for receiving shared locked content; and, FIGS. 5A-5F are figures illustrating example operations that may be performed on a device for sharing locked content; and, FIGS. 6A-6D are figures illustrating example operations that may be performed on a device for receiving shared locked content.

DETAILED DESCRIPTION

The system, method and apparatus will now be described by use of exemplary embodiments. The exemplary embodiments are presented in this disclosure for illustrative purposes, and not intended to be restrictive or limiting on the scope of the disclosure or the claims presented herein.

The technologies and techniques that are described herein provide a network service that allows users to share secret "encoded" or "locked" media, for example, photos and chats, with other designated users across social media platforms. The encoded media can only be viewed by applying an unlock code for the shared media at a receiving device. Recipients on any connected social network designated by the originator of the shared media may comment on the media. A chat stream related to the media may be aggregated, visible to the group and updated in real-time. Shared media and chat aggregation from multiple social media outlets may allow users to view all comments in one convenient place. Users may have a public comment stream alongside one that is visible only to users who know the unlock code. Devices may be implemented to include an "Explore" feature that includes public posts to create a marketplace where users can receive compensation for publishing content that encourages engagement and repeat visits by community members. For example, a user may be compensated when their game/puzzle that involves locked media exceeds a threshold number of views or when users pay to access hints for solving a puzzle involving locked media. The service provides a novel way to differentiate one's communication, provides privacy, and allows creation of a new marketplace where users can receive compensation for publishing games, puzzles and other features based on shared locked content. The service may utilize an Indexing scheme that allows recognition of the location of an image and associated chat stream independent of the social media site or application it was shared or modified on and match it up with a lock/unlock gesture. The content to be shared and to be unlocked may be any type of message, media, or content, including videos, documents, images, messages, audio files, content, or any other content the user desires to share.

Figure 1:
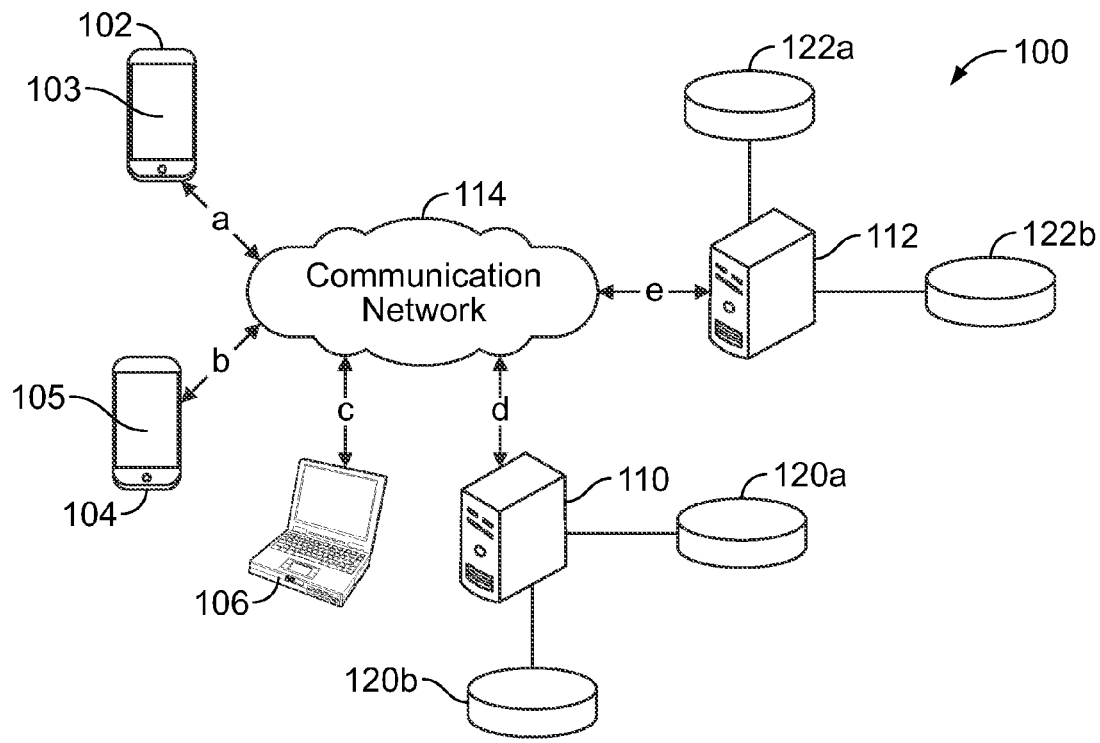
FIG. 1 illustrates an example system according to embodiments of the disclosure.

Referring now to FIG. 1, therein is illustrated an example system 100 into which embodiments of this disclosure may be implemented. In FIG. 1, system 100 is shown as including communication networks 114, a server 110 that is coupled to storage devices 120a and 120b, a server 112 that is coupled to storage devices 122a and 122b, computing device 102, computing device 104, and laptop computer 106. Servers 110 and 112 are illustrated as single servers but each may be representative of server functions or server systems provided by one or more servers or computing devices that may be co-located or geographically dispersed. The term server as used in this disclosure is used generally to include any computing devices or communications equipment that maybe implemented to perform the functions and processes of the disclosed embodiments. Servers 110 and 112 each may include one or more processors, or processing units, and memory, or other types of storage medium, including instructions in the form of code which when executed controls the server to implement the functions and processes of the example embodiments. The communications networks 114 provide connectivity for communications between computing device 102, computing device 104, laptop computer 106, servers 110 and 112, and other devices that may be connected to communications networks 114. Communication networks 114 may include one or more internet protocol (IP) networks comprising routers and switches for routing internet traffic carried in IP data packets and is not limited to a particular type of network. For example, communications networks 114 may include one or more wide area networks (WANs) or one or more local area networks (LANs) implemented in LAN topologies using a protocol such, for example, as Ethernet, TCP/IP, Frame Relay, Ethernet, FTP, HTTP, or a similar protocol. Communication network 114 also may include one or more wireless or landline networks that provide the network interfaces shown at interfaces a-e, respectively, for computing device 102, computing device 104, laptop computer 106 and servers 110 and 112 to communications network 114, so the various devices can communicate with each other over communication network 114. The wireless or landline networks of communications networks 114 that provide interfaces a-e may be comprised of any type of network that provides an appropriate network interface. For example interfaces a and b for computing device 102 and computing device 104 may be implemented on a wireless channel provided by a cellular network or on a Wi-Fi channel provided by a Wi-Fi access point of communications networks 114. Also, the interface which interfaces to 108 may be implemented over Wi-Fi, and interfaces d and e to servers 110 and 112 may be implemented over high speed fiber optic cable that connect servers 110 and 112 to the one or more IP networks of communications networks 114. Also, communications network 114 may include a Public Switched Telephone Network (PSTN) having land-line and cellular telephone terminals, or a network featuring a combination of any of the above mentioned networks.

In an example embodiment implemented in the system of FIG. 1, computing device 102 is configured to provide functions that allow a user of device 102 to activate a sharing function to share content, generate a lock code from input received as input gestures related to a display of an item associated with the content on the touchscreen 103 to lock at least a selected portion of the content to create locked content, and share the locked content with one or more other devices, such as device 104, through the communications networks 114. The unlocked content may be accessed through computing device 104 by inputting input gestures related to a display of the item associated with the locked content on touch screen 105. While computing device 102 and computing device 104 are shown as the example sharing device and receiving device, respectively, the embodiments may be implemented so that the devices are capable of performing both the sharing and receiving functions.

While computing device 102 and computing device 104 are each illustrated as implemented as an example smart phone, each one of computing devices 102 and 104 may be implemented as any type of computing device that may be configured with appropriate functionality supporting the processes for sharing media disclosed herein, including, a portable tablet computer, a laptop or desktop personal computer (PC), a multimedia/gaming device, a smart television, home theater system, a smart automobile system, a smart house system, a multimedia cable/television box, a smart phone, a tablet computing device, a personal digital assistant (PDA), a portable media player, a smart watch, etc.

In the example embodiment of FIG. 1, users of computing device 102 and computing device 104 may be subscribers or registrants of a Privacy-Controlled Social Network (PCSN) Service hosted and provided by a server such as server 110. For purposes of this disclosure a PCSN Service means any service that provides communications and processing that allow sharing functions on devices 102 and 104 to share content with other devices in the network, receive content from other devices, and, lock and unlock content to implement privacy.

Figure 2B:
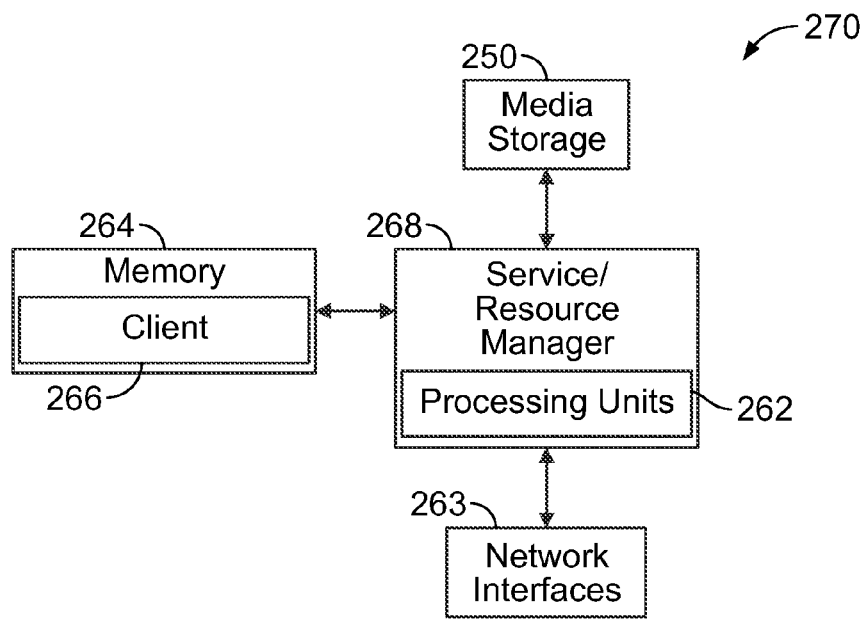
FIG. 2B is a block diagram of an example server that may be implemented in the system of FIG. 1.
Figure 2A:
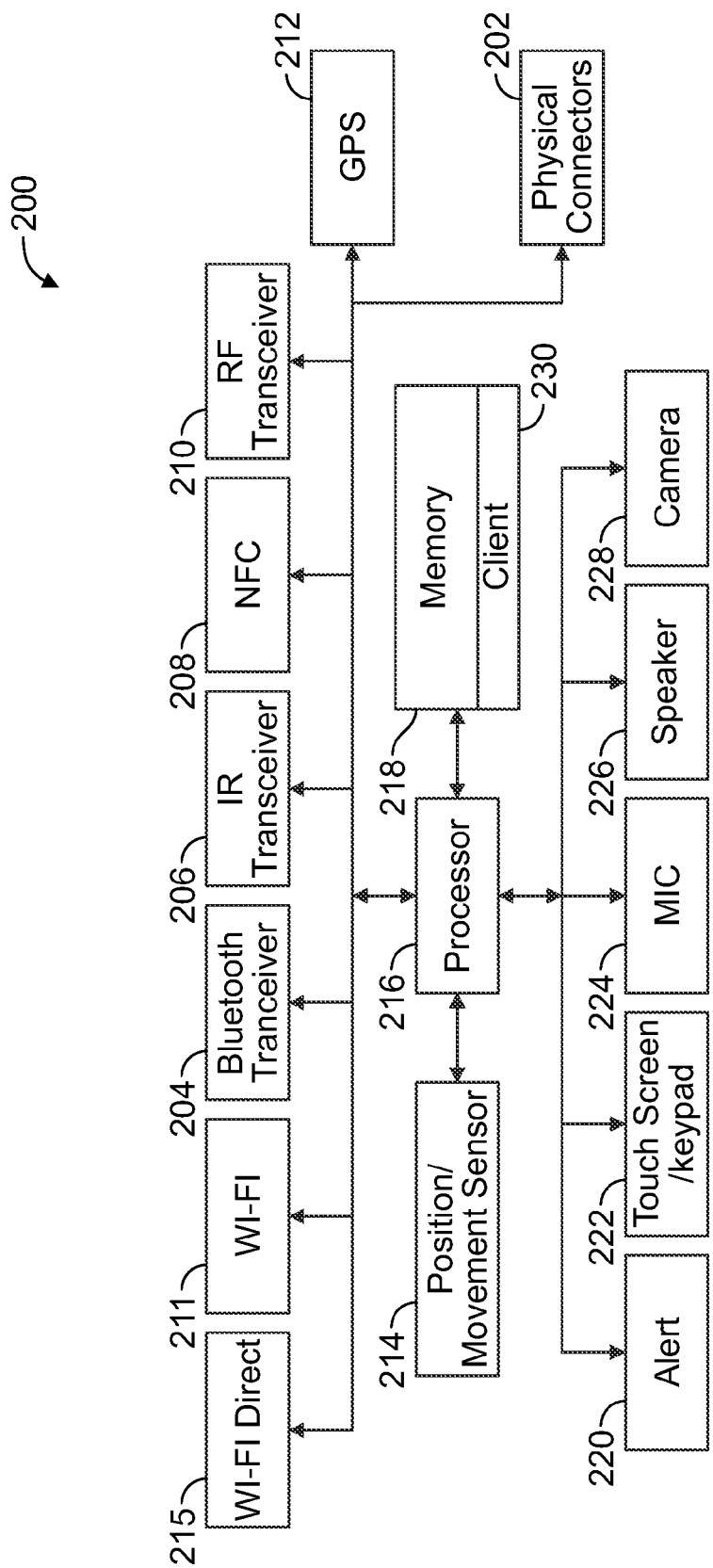
FIG. 2A is a block diagram of an example device that may be implemented in the system of FIG. 1.

Referring now to FIG. 2A, therein is an example block diagram of a computing device 200, according to which one or both of computing device 102 or computing device 104 of FIG. 1 may be implemented. Various implementations of computing devices 102 and 104 may differ and may each include more or less functions than, or variations of, the functionality shown by the blocks in FIG. 2A. Computing device 200 may include processor 216, which, while shown as one functional block, may be implemented by, and may comprise, one or more processors, and use of the term processer is meant to cover all such implementations. Computing device 200 also includes memory 218 which may be implemented as any type of storage in computing device 200, including non-volatile and volatile memory. Memory 218 includes instructions in the form of code for running the operating system and other applications in conjunction with processor 216 to control the operations of computing device 200. Memory 218 also may include data such as media data, camera photos and videos, contact data, calendar data, and other files used in the operation of computing device 200. Computing device 200 may also include a client, shown by the functional block 230 which is implemented by processer 216 and execution of code in memory 218. In an implementation of computing device 102 according to FIG. 2A, processor 216, memory 218 and client 230 may be configured to control the device to implement media sharing functions and processes that are described herein for computing device 102. In an implementation of computing device 104 according to FIG. 2A, processor 216, memory 218 and client 230 may be configured to control the device to implement media sharing functions and processes that are described herein for computing device 104. Client 230 may be downloaded to computing device 200 by a user or installed by any other means. In one alternative implementation, client 230 may be configured as part of the operating system of computing device 200.

Processor 216 controls data reception and transmission over communication interfaces that may be used to share and receive content according to the embodiments and may include, for example, physical connectors 202, Bluetooth transceiver 204, infrared (IR) transceiver 206, near field communications (NFC) function 208, RF transceiver 210, Wi-Fi interface 211 or Wi-Fi-direct interface 215. Processor 216 may also interface with and control global positioning service (GPS) receiver 212 and position/movement sensor 214. RF transceiver 210 and Wi-Fi interface 211 may enable wireless communication and file transfer with other devices or networks, such as network 114 according to various communication technologies, such as, for example, LTE, CDMA, TDMA or GSM/UMTS cellular, and IEEE 802.11 Wi-Fi, or other wireless technologies. Bluetooth transceiver 204 provides short-range-RF communications with other Bluetooth or Bluetooth low energy (LE) capable devices. Wi-Fi-direct interface 215 may also provide short range communication with other Wi-Fi-direct capable devices and near field communications (NFC) function 208 provides short range communications capabilities with other devices equipped with NFC. Device movement and orientation may be sensed by position/movement sensor 214. External vibration and shock, such as tapping of computing device 200 may also be sensed by position and movement sensor 214 and may be utilized in conjunction with other functions of computing device 200, such as, for example, user interfaces or NFC to implement functions such as a tap and send function for transferring files to other NFC devices. Physical connectors 202 may be used to connect computing device 200 to an external device to enable data connections and transfer of data through a physical communication interface connection. Processor 216 may communicate with and control alert 220, which may be a vibrator or audio alert to alert of received shared content, touch screen/keypad 222, speaker 226, microphone 224, and camera 228. The touchscreen/keypad 222 may be implemented as a user interface, for example as a separate touchscreen or keypad, or as a touch screen, that may have a virtual keypad capability, and that may interact with client 230 and other functions of computing device 200 to allow a user to input commands and selections to share content with other devices, receive content from other devices and lock and unlock shared content to implement privacy.

The user may use touchscreen/keypad 222, for example, when device 200 is implemented as computing device 102 or 104, to manage and control interaction with the PCSN Service hosted at server 110 or to manage communications on appropriate communications interfaces with other social network services, that may be hosted for example on server 112, and other devices in the system according to the processes described herein. The various alternative implementations of user interfaces that may also be used in the processes described herein also include interfaces, such as a natural user interface (NUI) using, for example, audio/speech recognition, gesture sensing or recognition, device movement or motion sensors, or interfaces using camera image recognition, bar code recognition, or any other type of interface by which a user may provide input to and/or receive output and information from computing device 200.

The sharing function for sharing private content may be implemented and activated on computing device 102 and computing device 104 as appropriate. In the embodiment, the function may activate when a user of the device specifically chooses to run it, by launching an application, for example. The sharing function may also activate when a user touches or selects a notification of shared content received from the application for the sharing function, or when a user touches or selects a displayed item associated with shared content posted on other social networks or websites integrated with the sharing function on the device. If the user wants to integrate the sharing function with other social networks, for example, Facebook® or Twitter®, the corresponding application for the social network may be installed on the device and an account may configured on the corresponding social network's system. If displayed items associated with content shared by the sharing function are selected from another social network the application will launch the sharing function of the PCNS service, if installed. Activation of the sharing function may require entry of a user name and a password for login or it may launch automatically. A "register now" option for the sharing function may also be provided if the sharing function is installed on a device but no account exists. Alternative options for login may include login to a social network application that is integrated with the sharing function on the device.

For fresh Install and/or registering for the sharing function, an initial install screen may display with a register and/or sign up selection the first time the sharing function program is run on the device. Locked content may be displayed that has been shared publicly by other devices through the PCSN service using the sharing function on the install screen. The content may be prioritized for display by how many likes, how many unlock attempts, and date published (shared). If a user clicks on any of the content on the install screen, they may be taken to a screen that provides a choice of registering/signing up or signing in. If the user is already registered they may choose to sign in and enter a user name or password. If the user signs in, the user may be provided with the option of login with one or more other social networks that are integrated with the sharing function on the device. If the user clicks a Register button, they may be taken to a registration screen and led through a registration process to sign up for the service. The registration process is performed by communicating with PCNS server 110 and allows the user to set and configure a user name, a password, a profile, etc. for the sharing function. The registration process may lead the user through the process of configuring the function by processing the user's phone contacts and finding users of the sharing function based on that information, including email addresses and phone numbers and adding friends. The sharing function registration process will also take the user through the process of integrating other social networks and adding contacts and friends from the social networks with the sharing function.

Referring now to FIG. 3 therein is a flow diagram illustrating example operations of a process for sharing locked content from a first device with at least one other device in accordance the embodiments. The process of FIG. 3 may be described with reference to FIG. 1 and FIGS. 5A-5F, and an example illustrating a user of device 102 locking content and sharing the locked content through the PCSN service. FIG. 3 will be described using the example of the user of computing device 102 being a subscriber to the PCSN service provided by server 110. Computing device 102 includes and implements functions for performing the operations shown in FIG. 3, including the appropriate interfaces, processors and code, as was described in relation to exemplary FIG. 2A. FIGS. 5A-5F show touchscreen 103 of device 102 during the process of FIG. 3.

At 302 the sharing function is activated on device 102. FIG. 5A shows the touchscreen 103 upon activation as displaying shared content, such as images 504a-504d that have been shared by other users. Each of 504a-504d represents a different image shared by one or more different users. Comments of the other users 506a-506c may also be displayed. The shared content may be locked or unlocked, and if locked may include public comments and if unlocked may include private and public comments. Shared Content may appear as unlocked if it was previously unlocked by the user of the sharing function. The home screen may show an aggregate of all images uploaded to the sharing function by the user and their friends appearing in chronological order from newest to oldest. Users may be able to review their posts 501 and categorize images in order for better searchability and sorting. Users may also have the ability to choose Explore 503 to explore other people's images that are shared publicly and also may have the ability to sort and filter their results to help choose which kind of posts they would like to view.

At 304 the user of device 102 may press either a Take Pic selection 505 to share new content or select a gallery option on touchscreen 103 to share already existing content. If the user presses the gallery button the process moves to 308 to obtain the content and a previously stored image may be retrieved from a photo gallery. This may be done by presenting a gallery display 509 on touchscreen 103 as shown in FIG. 5C that prompts the user to select 512 an image, such as image 510, from the displayed gallery 509 of different images or content. Alternatively, if the user presses the Take Pic selection 505 the device camera may be activated as shown in FIG. 5B. The process then moves to 306. The user may then create the content by taking a picture 508 for sharing as shown in FIG. 5B. When taking a picture, in one implementation, the image is not saved on a SD card or internal storage. The lifetime of the image that is taken should only be from the time it was taken to the time it is uploaded by the share function.

Next, at 310, when the user has either selected an image from the gallery, or has taken a picture from the camera view as the shared content, the content is displayed as an item for locking. In the embodiment, in the case of an image, locking of the content may be performed by modifying, blurring or distorting the whole image or selected portions of the image so that the image is not accessible or discernable to a person viewing the image. FIG. 5D shows touchscreen 103 displaying image 512 along with selection options 514a-514f for actions "None", "Blur", "Pixelate", "Spot", "Sticker", and "Text", respectively, for distorting or modifying the image.

At 310 "None" 514a may be selected by default. If any of the other actions are done to the image, and "None" 514a is selected again, this should clear all alterations to the image. When a user selects "Blur" 514b, the button may be highlighted to indicate to the user it has been toggled. The user then can touch selected portions or the whole image and that portion or particular section of the image may blur by a predetermined amount. "Pixel" 514c may work in the same fashion as "Blur" to pixelate selected portions of the image or the whole image. "Spot" 514d may be used to select portions or parts of the image or that will appear on the display while the rest of the image is not visible. There may also be another action selection button called "Sticker" 514e that will allow the user to place a sticker or stickers, with or without text, on the image to hide the image or portions of the image. Also, "Text" 514f allows the user to type or write stylus text over the image. The user may also choose to modify the displayed image by using a combination of two or more of the options for modifying or displaying the image.

Figure 5E:
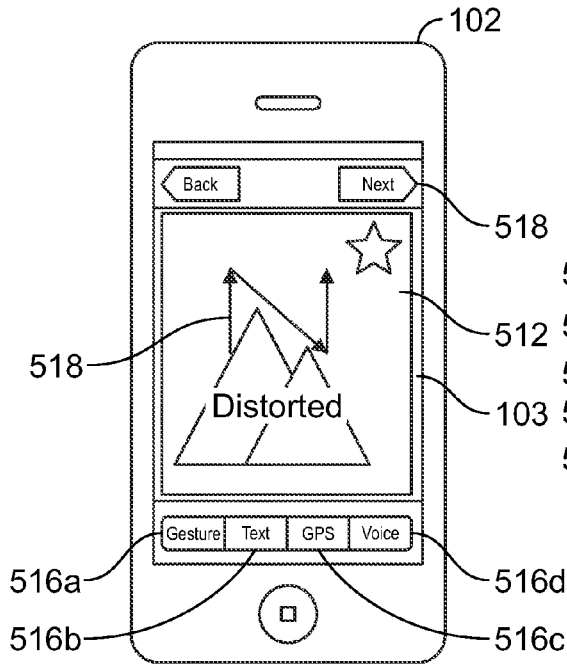
Figure 5F:
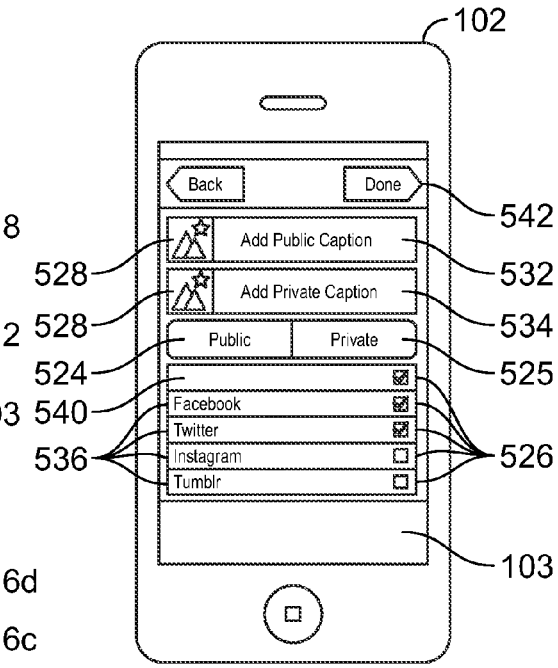

When User has finished their desired distortion/modification of the displayed item at 310 by selection of an appropriate action the process moves to 312 upon selection of the Next button 518. At 312 a lock code is generated. FIG. 5E shows this view of the distorted image 512 as the item displayed for lock code setup, where the text "Distorted"

indicates that the image is distorted or modified The user may add a lock/unlock code to make the original image private and available only after the unlock code is entered in conjunction with the display of the modified/distorted image at a receiving device. In an embodiment, the lock code may be created by the user inputting either gestures or touch points on the screen or entering other locking codes. The user may select from a menu which kind of input they desire to use. In FIG. 5E the user of device 104 is presented with the options of "Gesture" 516*a*, "Text" 516*b*, "GPS" 516*c*, or "Voice" 516*d* to create a lock code. The user may select Gesture 516*a* for setting the lock code. Then during lock code set up the sharing function records all touch and motions in the order as performed by the user on the touchscreen. For each gesture, there may be an adjustable threshold for error relative to the displayed image. When a user attempts to unlock the shared locked content with a gesture, the threshold may be set so that the user does not have to be extremely precise, but only within the adjusted threshold for error, in order to unlock the content. FIG. 5E illustrates example locking of the distorted image 512 by inputting a gesture shown by line 518 on the distorted image. If during the gestures or touches the user decides to start over, the user may select redo and any previous touches and gestures already entered for locking the image are erased and the user may start over again. Once the locking user selects next, lines display on the screen to illustrate the gestures and touches used to lock the content as the distorted image and the process moves to 314 where the touchscreen 103 appears as shown in FIG. 5F. The sharing function may employ a heuristic-based approach to detect the touch gestures on touchscreen 103. In this implementation, the heuristic may create a matrix on the touch screen and break single touch gestures into time intervals having individual touch gestures related to the display of the item on the touchscreen, or related to the display of the item by being input on the surface of the displayed item associated with the content. This data may then be serialized and stored on the PCNS server 110 when the content is shared. The function may apply a degree of variance and tolerance to the matrix and interval to facilitate locking and unlocking. If the user selects Text 516*b* the user may be prompted to enter a text lock code. If the user selects Voice 516*d* the user may be prompted to enter a voice activated lock code. Selecting GPS allows the user to set a location at, or an area within, which the receiving device must be located to unlock shared locked content. This could be done by manually entering GPS coordinates or the name of a location, when the location's coordinates are available, or using the current location of the device upon selection as received from the device's GPS receiver. In alternative embodiments, a combination of two or more of selections 516*a*-516*d* or other codes may be used together as the lock code, requiring that the receiving user use the correct combination to unlock the content.

At 314 a message may be configured to share with the content. Referring now to FIG. 5F, the user may add a public caption 532 that will display along with the item associated with the content/distorted/modified image 528 when other users browse it or display it for unlocking. The user may also add a secret message 530 that will only display once a receiving user has unlocked the shared content with the proper unlock gesture to display the original undistorted/unmodified image. In the embodiment, the default settings for the public selection 524 and private selection 522 on touch screen 103 may be set to Public, in order to encourage sharing with all users on the PCNS service. The user may select a check box 538 to share the content through the PCNS service 540 or also select one or more of other checkboxes 539 to select to share the content through one or more other social networks 536. If a user selects a checkbox 539 on any of the social network options 536 and that network has not been configured through the PCNS service yet, the sharing function will launch the initial flow to setup that particular network. The user may select "Public" 524 in order to share the content with all users registered on the PCNS service and selected social networks or, select "Private" 525 in order to share the content only with the user's friends on the PCNS service and selected social networks. In other implementations, the sharing function may be configured to allow the user to share the content directly with a specific or specified users other than all those in the public or private domains, for example, using a direct "one to one" sharing feature.

At 318, the user may click "Done" 542 to share the content and the sharing function will upload data, including the distorted/modified item or image, the original image or content and an indication of the lock/unlock code to the PCNS service server 110. After confirming upload of the data to server 110, the sharing function will then upload the distorted image and caption to its corresponding social networks that the user has chosen to share it with. In other embodiments, email and short message service (SMS) messaging, or other messaging types, such as, for example, messaging using the one or more of the short range interfaces of the computing devices shown in FIG. 2A, may be integrated with the sharing function to allow the user to share the locked content. The receiver device may then unlock the content with the sharing function.

In other embodiments, as an alternative to distorting an image or content to be shared and locking the image or content using a lock code entered in relation to a display of an item, where the displayed item is the distorted image or content itself, a lock code may be entered in relation to display of an item associated with the image or content but where the image is not the image or content itself. For example, if the content to be shared is an audio file, an item such as an icon representing an album cover may be displayed and the lock code may be entered in relation to display of the album cover on the device, either distorted or undistorted. The icon may then be shared with a receiving user who can unlock the shared audio by entering the appropriate unlock code in relation to a display of the icon at the receiving device, in another example, instead of sending an image or icon to perform a lock gesture on, users may select a tile from a tile set instead. The tile may be shared and the shared content accessed by entering a lock/unlock code in relation to a display of the tile.

In other alternatives, a first image may be distorted and shared as the item associated with the content and the unlocking done by entering the unlock code at the receiving device may be performed in relation to a display of the first image, while the unlocked content that is shared may include images in addition to or in place of the first image. Also, in other embodiments, the lock/unlock code may also be entered as other types of user input, such as a number code, spoken code, or any other type of code input to and processed by the devices in relation to the displayed item associated with the shared content. Additionally, in alternative embodiments, the content to be shared may be any type of message or media, including videos, documents, images, messages, audio, or other content the user desires to share.

In the embodiment of FIG. 3, the sharing function may allow the sharing user to convey what the unlock gesture is to a user of a receiving device. The caption for the image may be used to give some kind of indication or question indicating what the unlock gesture is. There may also be an option to set a "hint", which other users on the PCSN service can purchase to have access to. This hint may also be set by the sharing user, and dependent on the sharing user. In other implementations, the sender may be able to change the lock code to relock the shared content after the message is sent and even unlocked, and the sender may retain control of the hidden image and comment stream.

Referring now to FIG. 4, therein is a flow diagram 400 that illustrates example operations of a process for sharing locked content on a receiving device. The process of FIG. 4 may be described with reference to FIG. 1 and FIGS. 6A-6D, and illustrating a user of device 104 receiving shared locked content from a user of device 102 and accessing the content. In the processes of FIGS. 3 and 4, Server 110 includes and implements necessary PCSN service functions for performing the operations and providing PCSN services to computing device 102 and computing device 104.

Figure 6A:
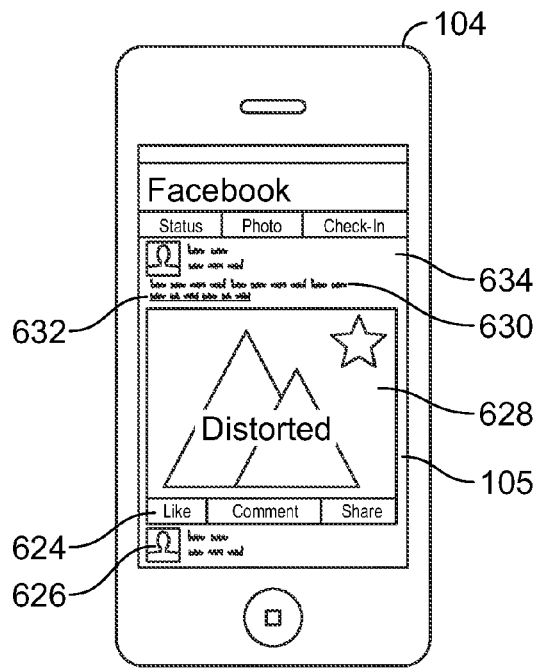

At 402 device 104 receives the shared item associated with the shared content and at 404 the user is notified. FIG. 6A illustrates an example of how notification of a post may appear when it has been shared from device 102 to another selected social network, such as for example Facebook®, and device 104 receives a post 634 of the content through the other social network. The post 634 may include the distorted picture image 628 and any public caption 630 created by the user of device 102. The public caption may also include a generic message stating that this user has shared an image through the sharing function and, if a secret message is included, indicate that a secret message has been shared. The post 634 may also include a link 632 indicated by the text "click here to unlock" that when clicked on opens and activates the PCNS service sharing function on device 104. Link 632 may also be used to convey information to server 110 as to which locked content device 104 is accessing. If the PCNS sharing function is not already installed on device 104 clicking the link 632 may take the user of device 104 to an app store to download and install the sharing function as an application. Alternatively, as an alternative to receiving a post of the shared content through another social network, the user of device 104 may be notified of a shared post directly by the PCNS service sharing function if logged in to the PCNS service or, if the sharing function is configured to notify the user of a received post, launch upon receiving a post.

At 406 the sharing function is activated as described above. In the example of FIG. 4, the user has clicked the link 632 within the display shown in FIG. 4 to activate and login to the sharing function. The sharing function may be implemented to check at 408 if the locked content was previously unlocked and if the locked content was previously unlocked by the user, the process may move to 414 and display the shared undistorted image as shown in FIG. 6D without requiring entry of the unlock code. The check at 408 and move to 414 may only be allowed, for example, if the previous unlocking of the content has taken place within a predetermined time. Otherwise, if a certain time has passed since the previous unlocking of the image at computing device 104, the process may move directly to 410 and require unlocking.

Figure 6B:
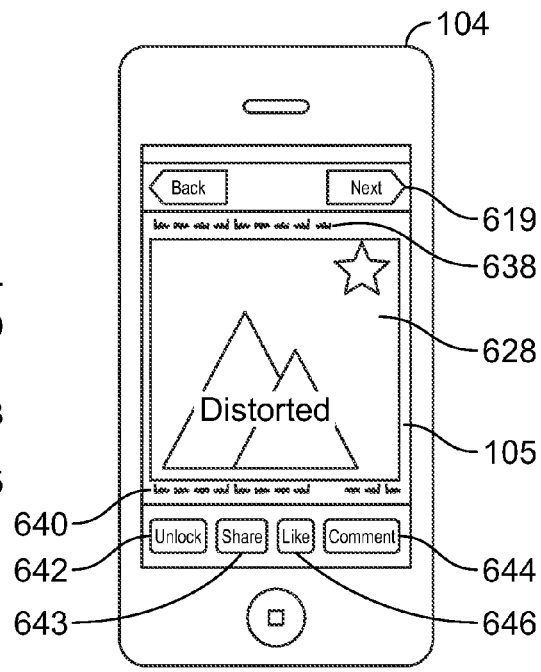

If the post was not previously unlocked by the user the distorted image 628 is displayed at device 104 as the item associated with the locked content at 410, along with any caption or hint 638 sent by the user of device 102, as shown in FIG. 6B. Also, the user of device 104 may activate the sharing function and display a distorted image as shown in FIG. 6B by selecting an image from multiple items displayed within the sharing function rather than responding to a post on another social network. This can either be a public image found through an Explore feature of the sharing function, or a private friend's image. In FIG. 6B, at the bottom of display 105, an aggregate of all comments 640 made through all the connected social media may be displayed when the distorted image is displayed. For example, if the image has been posted on other social networks such as, for example, Facebook® and Google+®, all comments about this image from the PCSN service, Facebook®, and Google+®, may be displayed in chronological order. In the example embodiment, the user may choose "Unlock" 642, "Share" 643, "Like" 646 or "Comment" 644 on the touch screen 105. Selecting Share 643 allows the user to share the image with others in the PCNS network. The comments from other social networks may be updated periodically or on demand.

Next, at 412, after the user selects Unlock 642 in FIG. 6B, the unlock code is generated from user input. The unlock code necessary to unlock the content at device 104 is the same code used as the lock code at the sharing device 102 and is entered in the same manner. FIG. 6C illustrates entry of the unlock code 650 on the distorted image 628. The user may be prompted to enter the unlock code and be allowed a predetermined number of attempts at unlocking the image. Once a user finishes an attempt at entering the unlock code, the users selects "Submit" 654 and the unlock code is sent to server 110. If the entered unlock code is incorrect, an error message will be displayed along with how many incorrect attempts have been made or along with how many remaining attempts are available to the user. At any time, the user can choose to hit "Redo" 652 instead of Submit 654, which will restart the unlock code entry.

As was described for the locking in relation to FIG. 3, the sharing function may employ a heuristic-based approach to detect the touch gestures on touchscreen 105 for generating the unlock code. In this implementation, the heuristic may create a matrix on the touch screen and break single touch gestures into time intervals having individual touch gestures related to the displayed item. This data may then be serialized and sent to the PCNS server 110 when Submit 654 is selected. The function may apply a degree of variance and tolerance to the matrix and interval to facilitate locking and unlocking and comparison of the lock and unlock codes.

In other embodiments, the manner of entering and processing the unlock code may be determined by the locking process used on the sharing device that posts the shared content. Alternatives for unlocking may be implemented when the content has been locked as discussed in relation to the alternative locking processes for FIG. 3. For example, as an alternative to unlocking a displayed item comprising a distorted image or content to be shared, where the displayed item is the distorted image or content itself, a unlock code may be entered in relation to display of an item associated with the image or content but where the displayed item is not the image or content itself. For example, if the content to be shared is an audio file, an item such as an icon representing an album cover may be displayed and the unlock code may be entered in relation to display of the album cover on the device, either distorted or undistorted. Additionally, in other alternatives a first image may be distorted, locked, shared at a sending device and displayed as the item associated with the locked content at the receiving device. The unlocking may be performed by entering the appropriate unlock code at the receiving device in relation to a display of the first image, while the unlocked content that is shared upon unlocking may include a second image or other images in addition to or in place of the first image.

Also, in other embodiments, the lock and unlock codes may also be entered as any type of user input used to lock the content, such as those shown in FIG. 5E, including "Gesture" 516a, "Text" 516b, "GPS" 516c or "Voice" 516d, or other type of code input to and processed by the devices. Also, a combination of one or more codes may be used to lock and unlock the content. Additionally, in alternative embodiments, the content to be shared and to be unlocked may be any type of message or media, including videos, documents, images, messages, audio, or other content the user desires to share.

In another example embodiment the unlock code may include or be associated with a position requirement on the location of the receiving device. In this case the correct unlock code would be considered valid only if the position requirement was met by the receiving device being in a particular location upon entry of the unlock code. This could be implemented through any implementations that allowed entry or determination of the position requirement at the sharing device and a determination that the receiving device met the position requirements upon entry of the lock code using, for example, the GPS receiver of the receiving device as input. In one alternative, the GPS requirement may be the only unlock code requirement and the content would unlock upon a determination that the receiving device's location met the position requirements.

Referring again to FIG. 4, when the user has entered the correct unlock code this is detected at server 110 and server 110 sends the unlocked content and associated information to device 104. The process moves to 414 where, as shown in FIG. 6D, the hidden message 658 now displays above the image and the undistorted image 656 is loaded by the sharing function in place of the distorted image from server 110 and displayed as indicated by the text "Clear Image". Hidden comments 660 may also be shown. This may be done by downloading the image in a secure temporary cache on device 104 that cannot be accessed by external applications. Additionally the image cache may expire once the image is no longer viewed.

Hidden comments include any comments 660 other users have made while the image 656 has been unlocked on their device after the content was shared with them using the PCNS service sharing function. The hidden comments can only be seen by users who have unlocked the content.

In other embodiments rather than using a link, such as link 632 as shown in FIG. 6a, to convey information about the content to the server it may be useful to identify the locked content directly from the shared item associated with the shared content. This may be useful when the item is an image associated with the locked content and is emailed or SMS messaged to a recipient with no other information. In this case the sharing function may utilize a multi-faceted approach to image identification and association of the item with particular locked content. This involves using a combination of identifiers and tags, hue & color saturation/ratios, and vectors within the image to determine which content and unlock code the image is associated with at the PCSN server. This provides an advantage over stenographic techniques in that the image is more likely to withstand the resizing, compression and loss of image manipulation that exists in social networking platforms. Additionally, images may be marked with a watermark at the user's request to indicate image association. The sharing function may scan for images tagged to invoke the application. Additionally, the sharing function may scan images or web pages to see if those images are associated with hidden images upon a user's request.

Referring now to FIG. 2B, therein is illustrated an example block diagram of a server 270 according to which server 110 of FIG. 1 may be implemented. Various implementations of server 110 may differ and may each include more or less functions than, or variations of, the functionality shown by the blocks in FIG. 2B. Server 270 includes media storage 250, network interfaces 263, service/resource manager 268, and memory 264. Service/resource manager 268 may include processing unit 262 and memory 264 may include client 266. Processing unit may comprise one or more processors or processing units. Network interfaces 263 may comprise any type of interface that provides capability to server 270 to communicate and exchange data with other devices, such as computing devices 102 and 104 and servers over networks, such as communications networks 114. Memory 264 may be implemented as any type of storage, including non-volatile and volatile memory. Memory 264 includes instructions in the form of code for managing services and resources and performing other functions in conjunction with service/resource manager 268 and processing unit 262 to control the operations of server 270. In an implementation of server 110 according to server 270 of FIG. 2B, service/resource manager 268, processing unit 262, memory 264 and client 266 may be configured to control the server to implement the functions that provide services for devices to share content with other devices, receive content from other devices and, lock and unlock shared content to implement privacy as described herein for server 110.

Referring again to FIG. 1, as the processes shown and described in relation to FIGS. 3 and 4 are performed at computing devices 102 and 104, server 110 communicates with the devices and provides the overall management functions for the sharing provided by the PCNS service. In an embodiment Server 110 receives the lock code, the item associated with the shared content, and the shared content from computing device 102 and receives the unlock code from computing device 104. Server 110 also receives identifying information from computing device 104 that identifies the shared content associated with the unlock code. Server 110 then compares the lock code comprising encoded input related to the display of the item associated with the shared content on the first computing device with the unlock code comprising encoded input related to the display of the item associated with the shared content on the second computing device. If the lock code and unlock code match, server 110 sends the shared content to the second device.

Code on server 110 also facilitates registration of users for the PCNS service by providing authentication of user and devices, addition, retrieval, editing, deletion and storage of user network preferences and profiles, and storage of user connection to other users. Also server 110 controls addition, retrieval and deletion of users' post which include public and private images, public and private image indexes, serialized gestures, captions, hints, comment streams, shared networks and other metadata. Server 110 also retrieves public posts available to a specific user, submits and validates unlock attempts by users, and retrieves a private image once a valid unlock is provided. Server 110 may also provide a log of crash data for the PCNS service.

The example embodiments disclosed herein have been described in the general context of processor-executable code or instructions stored on memory that may comprise one or more computer readable storage media (e.g., tangible non-transitory computer-readable storage media such as memory 218 or 264). As should be readily understood, the terms "computer-readable storage media" or "non-transitory computer-readable media" include the media for storage of data and program instructions, such as memory 218 or 264, and do not include propagated or modulated data communication signals.

While the functionally disclosed herein has been described by illustrative example using descriptions of the various components and devices of embodiments by referring to functional blocks and processors or processing units, and memory including instructions and code, the functions and processes of the embodiments may be implemented and performed using any type of processor, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc.

Also, although the subject matter has been described in language specific to structural features and/or methodological acts, it is to be understood that the subject matter defined in the appended claims is not necessarily limited to the specific features or acts described above. Rather, the specific features and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the communication process, these elements, and operations may be replaced by any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A device comprising:
a user interface for receiving input; and,
a processor and memory including code, the code executable to cause the processor to control the device to:
activate a sharing function for sharing content through at least one network in response to input received at the user interface;
generate a lock code from input related to a display of an item associated with the content on the user interface to lock at least a portion of the content to create locked content, and,
share the locked content with at least one other device through the at least one network.

2. The device of claim 1, wherein the user interface comprises a touchscreen, the at least a portion of the content includes media content, and the lock code comprises input gestures related to a display of an item associated with the media content on the touchscreen.

3. The device of claim 1, wherein the code is further executable to cause the processor to control the device to modify a display of an item associated with the content on the user interface in response to input received at the user interface, and wherein the processor generates the lock code from input related to the modified display of the item.

4. The device of claim 3, wherein the modified display of an item comprises a display of a distorted image.

5. The device of claim 1, wherein the at least a portion of the content further includes a message that may be read upon unlocking the locked content and wherein the locked content is shared by including a public caption with the locked content.

6. The device of claim 1, wherein device shares the locked content by transmitting an indication of the lock code, the displayed item associated with the locked content, and the locked content to a server.

7. The device of claim 1, wherein the code is further executable to cause the processor to control the sharing function to receive and display a comment associated with the locked content sent from the at least one other device with which the locked content is shared.

8. The device of claim 1, wherein the at least one network through which the locked content is shared includes a Privacy-Controlled Mobile Social Network and at least one other Public Social Network.

9. A device comprising:
a user interface for receiving input; and,
a processor and memory including code, the code executable to cause the processor to control the device to:
receive an item associated with locked content, wherein the locked content was locked with a lock code;
activate a sharing function for processing the locked content;
generate an unlock code from input related to a display on the user interface of the item associated with locked content to unlock the locked content; and,
display the locked content as unlocked content.

10. The device of claim 9, wherein the user interface comprises a touchscreen, the locked content includes media content, and the unlock code comprises input gestures related to a display of an item associated with the media content on the touchscreen.

11. The device of claim 9, wherein the display an item associated with locked content comprises a display of a modified image on the touchscreen.

12. The device of claim 11, wherein the display of a modified image comprises a display of a distorted image.

13. The device of claim 9, wherein the locked content further includes a message that may be read upon unlocking the locked content.

14. The device of claim 9, wherein the locked content is shared by including a public caption with the locked content.

15. The device of claim 9, wherein the code further causes the processor to control the device to transmit an indication of the generated unlock code to a server and wherein the unlocked content is displayed based on data received from the server in response to the lock code matching the unlock code.

16. The device of claim 9, wherein the code is further executable to cause the processor to control the sharing function to receive and display a comment associated with the locked content sent from the at least one other device with which the locked content is shared.

17. A server hosting a privacy-controlled sharing service and comprising:
a processor unit and memory including code, wherein execution of the code causes the processor unit to control the server to:
receive a lock code and shared content from a first device, wherein the lock code includes encoded input related to a display of an item associated with the shared content on a first user interface;

receive an unlock code from a second device wherein the unlock code includes encoded input related to a display of the item associated with the shared content on a second user interface;

compare the lock code and unlock code, and, if the lock code and unlock code match;

send the shared content to the second device.

18. The server of claim 17, wherein the server further receives identifying information from the second device that identifies the shared content associated with the unlock code.

19. The server of claim 17, wherein lock code comprises encoded input gestures related to a display of an item associated with the shared content on the first touchscreen and the unlock code comprises encoded input gestures related to a display of an item associated with the shared content on the second touchscreen.

20. The server of claim 17, wherein the shared content includes a message and media content.

\* \* \* \* \*